G. B. WARREN.
FEED BOX OR TROUGH.
APPLICATION FILED APR. 3, 1908.
1,102,371.
Patented July 7, 1914.
2 SHEETS—SHEET 1.
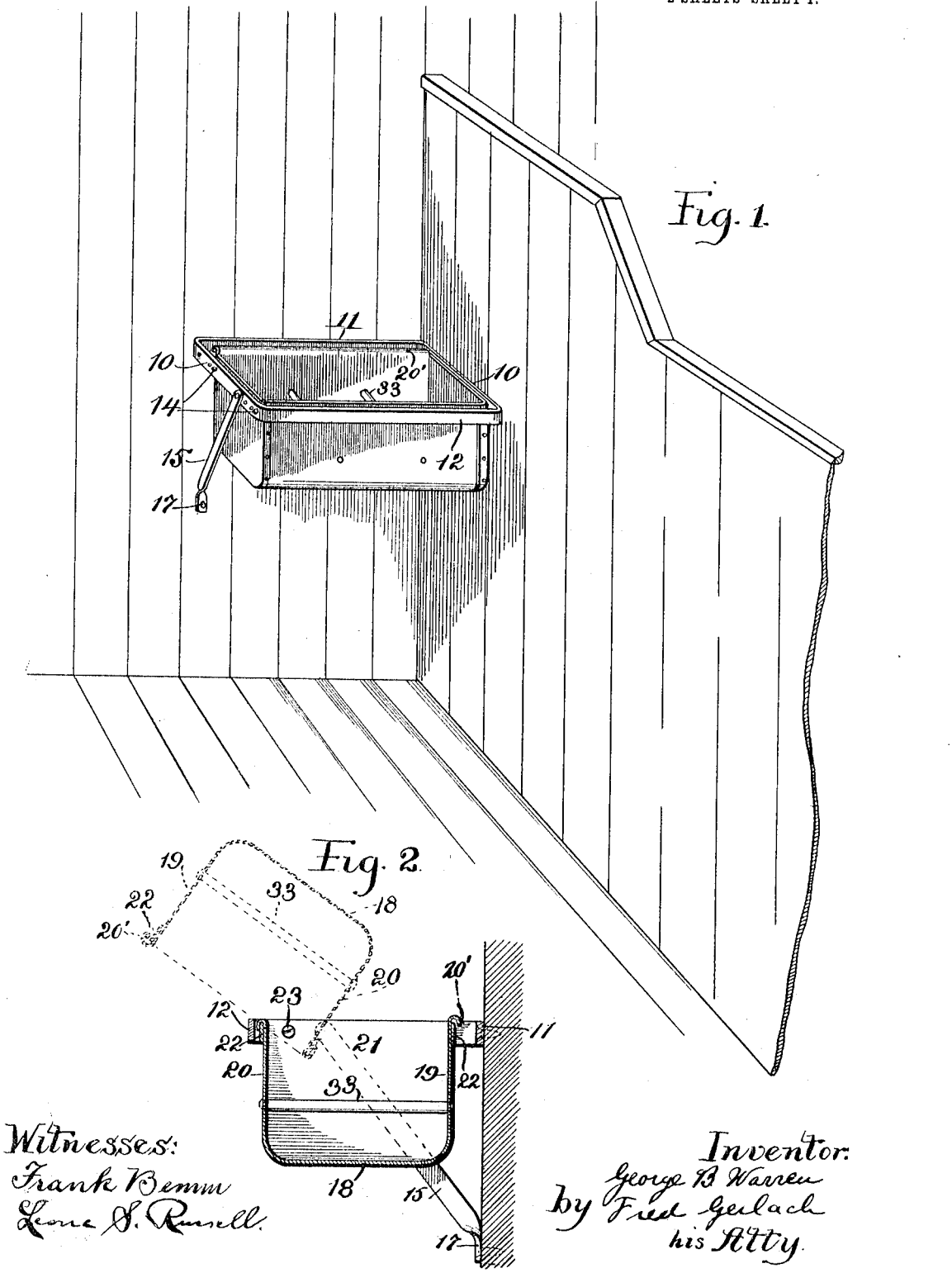

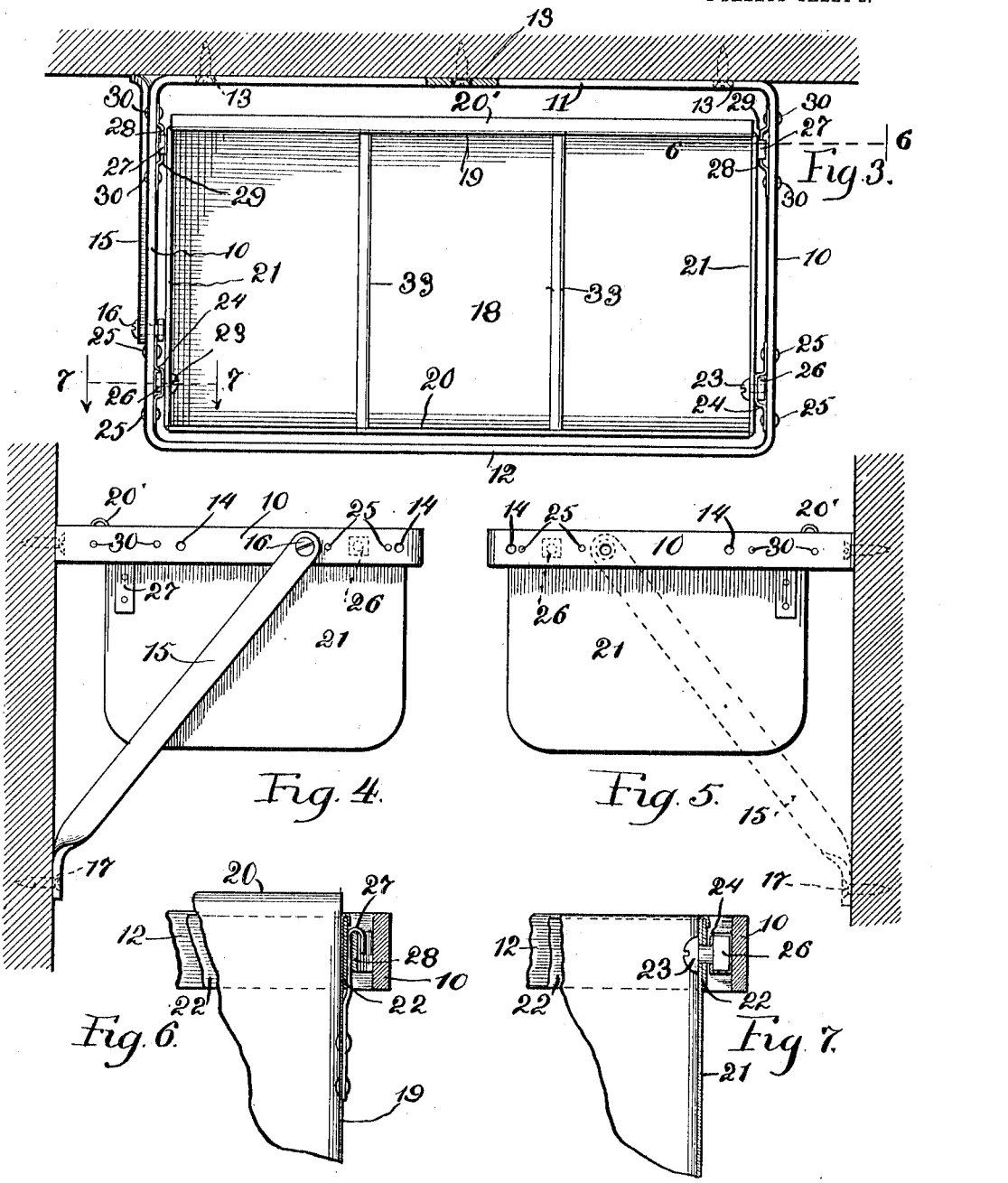

UNITED STATES PATENT OFFICE.

GEORGE BERTRAM WARREN, OF ROCKFORD, ILLINOIS.

FEED BOX OR TROUGH.

1,102,371.  Specification of Letters Patent.  Patented July 7, 1914.

Application filed April 3, 1908. Serial No. 424,872.

*To all whom it may concern:*

Be it known that I, GEORGE B. WARREN, a resident of Rockford, in the county of Winnebago and State of Illinois, have invented certain new and useful Improvements in Feed Boxes or Troughs, of which the following is a full, clear, and exact description.

The invention relates to feed-boxes or troughs and more particularly to those which are adapted to be secured to one of the walls of a stall.

After a charge of grain or feed has been placed in a box or trough and been consumed by the animal, there is usually left in the box impurities which the animal does not care to, or should not, consume. Accumulation of these impurities renders the box or trough unsanitary in the course of time.

One object of the invention is to provide an improved device which may be readily secured in proper position in a stall, preferably in one of the corners thereof, and which may be tilted or dumped to discharge the impurities and prevent the accumulation thereof so that the feed-box may be kept in sanitary condition and further, to provide a tiltable box which is mounted in such manner that the animal cannot tilt it.

Another object of the invention is to provide a device which comprises a supporting-frame for a tiltable box, which may be readily installed and which is of such construction that all projections likely to result in injury to the animal will be effectively avoided.

Still another object of the invention is to provide means in the trough which prevents the animal from slobbering and spilling the grain out of the box.

The invention also designs to provide an improved and simple construction for feed-boxes and troughs which is sanitary and may be readily installed in a barn.

The invention consists in the several novel features hereinafter set forth and more particularly defined by claims at the conclusion hereof.

In the drawings: Figure 1 is a perspective of a portion of a stall provided with the improved feed-box or trough. Fig. 2 is a transverse section, the box being shown by dotted lines, in position to discharge the contents. Fig. 3 is a plan. Figs. 4 and 5 are side elevations viewed from opposite sides respectively. Fig. 6 is a section on line 6—6 of Fig. 3. Fig. 7 is a section on line 7—7 of Fig. 3.

The improved feeder comprises a supporting-frame formed of a bar and constituted of sides 10, a back 11, and a front rail 12. The back-rail 11 is perforated as at 13 so the frame may be screwed or nailed to the back-wall of a stall. By reason of the rectangular form of the frame the feed-box or trough may be held therein so as to protect the upper edges of a sheet-metal feed-box, thus preventing the animal from being scratched or injured or injuring the box. In practice, the feeder is usually installed in one corner of the stall and in the installation of the improved feeder, one of the side walls is utilized to support one side of the frame, each of the side-rails being perforated as at 14 for screws or nails for securing it to the contiguous side-wall of the stall. To better support the other side of the supporting-frame, a brace 15 is secured to one of the side-rails 10 by a screw 16 and extends downwardly and rearwardly so that its lower end will fit against the back wall of the stall, being secured thereto by a screw 17. Each of the side-bars of the supporting-frame is provided with holes 14 whereby it may be secured to one of the side walls of the stall, and a perforation for a screw 16, and this construction makes it possible to utilize either side-wall for sustaining one side of the supporting frame and the brace for the other side. Thus the supporting-frame is adapted to be secured, without change of construction, in the corner at either side of the stall, the braces 15 being capable of being secured to the other side-wall. This construction is advantageous in that the feeders may be made at the factory and by merely securing the brace to one side or the other they may be installed snugly in either corner of a stall.

The box or trough for holding the grain or feed is formed of sheet-metal and comprises a bottom 18, a back-wall 19, a front-wall 20 and side-walls 21. The upper edges of the front, back and side-walls of the box are disposed approximately in the plane of the upper edge of the supporting-frame and within the frame, to avoid any projections on which the animal can be scratched, and to render it impossible for the animal to injure the walls of the box. A metallic strap 22 is secured to, and extends around, the side-walls, back-wall, and front-wall of the box to rigidify the latter. The box is pivotally mounted in the supporting-frame by screws 23 which are disposed near the upper and front corner of the box and extend through one of the side walls and a clip 24 which is secured to the adjacent side-bar 10 of the supporting-frame by screws or rivets 25. Each clip 24 is bent away from the side-bar 10 to receive a retaining-nut 26 on screw 23. This disposition of the pivotal connection between the grain box and the supporting-frame makes it possible to swing or tilt the box from its normal operative position so that the back of the box will swing upwardly and forwardly until the box is arrested by the front rail of the supporting-frame, as indicated by dotted lines Fig. 2. In such tilted position the contents of the box will be discharged and removed.

A stop 27 is secured to each of the box-sides 21 and consists of a strip of metal, the upper end of which is bent to engage a coöperating stop 28 on one of the side bars 10 of the supporting-frame. Stops 28 are preferably formed of strips of metal having their central portions bent inwardly as at 29 and their terminals secured to the inner side of the side-bars 10 by rivets 30. Said stops normally position the box in the frame so that the upper edge of the box will be properly disposed in the frame. As a result of this disposition of the box-pivot and the construction aforesaid, the box will be held in operative position by gravity and in such manner that the animal cannot tilt the box, because it is impossible for the animal to lift the back of the box upwardly. For convenience in dumping the box the upper edge of the back-wall is bent backwardly as at 20′ so that the box can be conveniently lifted by the fingers of the attendant when inserted between the back-bar 11 of the supporting-frame and the back of the box.

Thus it will be seen that the invention provides a simple device which may be readily applied to either corner of the stall and which comprises a box which can be tilted by the attendant to discharge the contents of the box therefrom but it cannot be discharged or injured by the animal.

It is customary for animals, when a full charge of feed is in the box, to move their jaws in the grain in the box in attempting to hurriedly consume the grain. When this is done the grain is frequently spilled out of the box by the animal, thus causing the grain to be lost and slobbered instead of being gradually consumed. To prevent the animal from doing this, rods 33 extend transversely across the box some distance above its bottom. The front and rear ends are respectively secured in the front and rear walls of the box. These bars are sufficient distances apart to permit the mouth and jaws of the animal to eat the grain from the bottom of the box, but prevent the animal from pushing the grain from side to side. Resultantly, when the animal places its mouth in one of the spaces between the bars or between one bar and one of the side-walls, it cannot slobber the grain around the box or out of it. Furthermore, when the animal eats out of one of the spaces some of the grain will be pushed away from that space, making it necessary for the animal to withdraw its head to reach grain from one of the other spaces. As a result of this means the animal is taught to consume the grain gradually and waste of grain is avoided, and the box is kept in a more sanitary condition.

Having thus described the invention, what I claim as new and desire to secure by Letters Patent, is:

1. In a feeder, the combination of a frame including side bars and a front bar, means whereby the side bars of the frame may be secured to the wall of a stall, a feed-box having the upper end of its walls within the frame and pendent therefrom, pivotal connections between the sides of the feed-box and the sides of the frame and located at the upper portion of the feed-box and at the forward ends of the respective sides of the box and frame, whereby the box is adapted to be turned from the rear forwardly and inverted to discharge over the front bar.

2. In a feeder, the combination of a frame including side bars and a front bar, means whereby the side bars of the frame may be secured to the wall of a stall, a feed-box having the upper ends of its walls within the frame and pendent therefrom, pivotal connections between the sides of the feed-box and the sides of the frame, said pivotal connections being located within the spaces between the sides of the frame and the sides of the box and located at the upper portion of the feed-box and at the forward ends of the respective sides of the box and frame, so that the box may be turned from rear forwardly and inverted to discharge over the front bar.

3. In a feeder, the combination of a frame including side bars and a front bar, means whereby the side bars of the frame may be secured to a wall or walls of the stall, a feed box having the upper ends of its walls within the frame and pendent therefrom, pivotal connections between the sides of the feed-box and the sides of the frame and located at the upper portion of the feed box and at the forward ends of the respective sides of the box and frame, whereby the box is adapted to be turned from the rear forwardly and inverted to a discharging position, and co-acting stop mechanism comprising hooks attached to the sides of the box and engaging the frame at the rear thereof, for holding the box in its normal position.

4. In a feeder, the combination of a frame including side bars and a front bar, means whereby the side bars of the frame may be secured to a wall or walls of the stall, a feed box having the upper ends of its walls within the frame and spaced from the frame and pendent therefrom, pivotal connections between the sides of the feed box and the sides of the frame, said pivoted connections being located within the spaces between the sides of the frame and the sides of the box, and located at the upper portion of the feed box and at the forward ends of the respective sides of the box and frame, said pivoted connections adapting the box to be turned from the rear forwardly and inverted to a discharging position, and co-acting stop mechanism comprising hooks attached to the sides of the box and engaging the frame, at the rear thereof, and located within the spaces between the sides of the frame and the sides of the box, said stop mechanism adapted for holding the box in its normal position.

5. In a feeder, the combination of a frame including side bars and a front bar, means whereby the side bars of the frame may be secured to a wall or walls of the stall, a feed box having the upper ends of its walls within the frame and spaced from the frame and pendent therefrom, pivotal connections between the sides of the feed box and the sides of the frame, said pivotal connections being located within the spaces between the sides of the frame and the sides of the box, and disposed at the upper portion of the feed box and at the forward ends of the respective sides of the box and frame, each pivotal connection consisting of a U-shaped strap having its ends secured to the side of the frame and its base or transverse member adjacent to the side of the box, and a pivot pin extending from the side of the box into the loop of the U-shaped strap and a nut on the threaded end of the pin, and located within the loop of the U-shaped strap, the said pivotal connections adapting the box to be turned from the rear forwardly and inverted to a discharging position, and co-acting stop mechanism between the sides of the box and the frame at the rear thereof, for holding the box in its normal position, each of said stop mechanisms comprising a U-shaped strap having its ends secured to the side of the frame and a base or transverse member adjacent to the side of the box, and an arm secured to the side of the box and extending upwardly and bent into hook form to engage over the base or transverse member of the U-shaped strap.

GEORGE BERTRAM WARREN.

Witnesses:
B. B. SHIRLEY,
C. H. WILOX.

Copies of this patent may be obtained for five cents each, by addressing the "Commissioner of Patents, Washington, D. C."